(12) United States Patent
Sato et al.

(10) Patent No.: US 8,500,308 B2
(45) Date of Patent: Aug. 6, 2013

(54) LIGHT SOURCE DEVICE AND ILLUMINATION DEVICE USING THE SAME

(75) Inventors: Eiichi Sato, Hachioji (JP); Kenji Fukuoka, Fussa (JP); Hiroyasu Sato, Hachioji (JP)

(73) Assignee: Opto Design, Inc. (JP)

( * ) Notice: Subject to any disclaimer, the term of this patent is extended or adjusted under 35 U.S.C. 154(b) by 107 days.

(21) Appl. No.: 13/122,355

(22) PCT Filed: Oct. 1, 2009

(86) PCT No.: PCT/JP2009/067149
§ 371 (c)(1),
(2), (4) Date: Apr. 1, 2011

(87) PCT Pub. No.: WO2010/041586
PCT Pub. Date: Apr. 15, 2010

(65) Prior Publication Data
US 2011/0182051 A1      Jul. 28, 2011

(30) Foreign Application Priority Data

Oct. 7, 2008 (JP) .................................. 2008-260647
Jul. 31, 2009 (JP) .................................. 2009-179005

(51) Int. Cl.
*F21V 7/00* (2006.01)

(52) U.S. Cl.
USPC ... 362/297; 362/19; 362/217.05; 362/249.02; 362/560

(58) Field of Classification Search
USPC ................ 362/19, 217.05, 235, 241, 249.02, 362/296.01, 297, 298, 308, 309, 341, 555, 362/560, 609, 612, 800
See application file for complete search history.

(56) References Cited

U.S. PATENT DOCUMENTS

| 7,229,198 B2 | 6/2007 | Sakai et al. |
| 2005/0007756 A1 | 1/2005 | Yu et al. |
| 2006/0221619 A1 | 10/2006 | Nishigaki |

(Continued)

FOREIGN PATENT DOCUMENTS

| CN | 1836133 A | 9/2006 |
| CN | 101097272 A | 1/2008 |

(Continued)

OTHER PUBLICATIONS

"European Application Serial No. 09819121.6, Supplemental European Search Reprot mailed May 14, 2012", 9 pgs.

(Continued)

*Primary Examiner* — Stephen F Husar
*Assistant Examiner* — Meghan Dunwiddie
(74) *Attorney, Agent, or Firm* — Schwegman Lundberg & Woessner, P.A.

(57) ABSTRACT

A light source device is provided with an LED having strong directivity, a reflective hood which has an interior reflecting surface for reflecting the illumination light from the light source, and a pair of first and second polarizing reflective plates for polarizing the illumination light from the LED in a specific direction. The first and second polarizing reflective plates have a specific length and width, and a back surface formed from a high reflectance plate. The light source is secured to the reflective hood. A specific interval is provided between the first and second polarizing reflective plates and the reflecting surface of the reflective hood, and a specific interval is provided between the two plates with the optical axis passing through the 0° direction angle of the light source in between.

10 Claims, 13 Drawing Sheets

U.S. PATENT DOCUMENTS

| | | |
|---|---|---|
| 2007/0014126 A1 | 1/2007 | Kuo et al. |
| 2007/0147036 A1 | 6/2007 | Sakai et al. |
| 2008/0002393 A1 | 1/2008 | Moon |
| 2008/0159693 A1 | 7/2008 | Chang |

FOREIGN PATENT DOCUMENTS

| | | |
|---|---|---|
| EP | 1653149 A1 | 5/2006 |
| JP | 2000-332698 A | 11/2000 |
| JP | 2001-236811 A | 8/2001 |
| JP | 2002-169203 A | 6/2002 |
| JP | 2005-099406 A | 4/2005 |
| JP | 2005-149848 A | 6/2005 |
| JP | 2006-276728 A | 10/2006 |
| JP | 2007-20856 A | 2/2007 |
| WO | WO-2004/111532 A2 | 12/2004 |
| WO | WO 2007/037035 A1 | 4/2007 |

OTHER PUBLICATIONS

"International Application Serial No. PCT/JP2009/067149, Written Opinion mailed Dec. 8, 2009", (w/ English Translation), 6 pgs.

"International Application Serial No. PCT/JP2009/067149, International Preliminary Report on Patentability mailed May 26, 2011", (w/ English Translation of Written Opinion), 5 pgs.

"International Application Serial No. PCT/JP2009/067149, International Search Report mailed Dec. 8, 2009", (w/ English Translation), 5 pgs.

"Chinese Application Serial No. 200980139015.3, Office Action mailed Dec. 3, 2012", (w/ English Translation), 6 pgs.

LIGHT SOURCE DEVICE AND ILLUMINATION DEVICE USING THE SAME

RELATED APPLICATIONS

This application is a nationalization under 35 U.S.C. 371 of PCT/JP2009/067149, filed Oct. 1, 2009 and published as WO 2010/041586 A1 on Apr. 15, 2010, which claimed priority to Japanese Patent Application No. 2008-260647, filed Oct. 7, 2008; and Japanese Patent Application No. 2009-179005, filed Jul. 31, 2009; which applications and publication are incorporated herein by reference in their entirety.

TECHNICAL FIELD

The present invention relates to a light source device and an illumination device using this light source device, and more particularly relates to a light source device using a highly directional point light source such as a light emitting diode (hereinafter, referred to as an LED) as a light source and an illumination device that can provide uniform plane illumination light over a large area using this light source device. These devices can also be used as an illumination device in a wide range of fields such as that for a backlight for a liquid crystal panel, various display panels, electrical sign boards, or illumination in an automobile, a rail vehicle, an airplane, and the like.

BACKGROUND ART

As a planar illumination device, a direct type illumination device and an edge-light type illumination device are known. In the direct type illumination device, as can be seen in a backlight for a liquid crystal panel for example, a diffusive plate formed of a plate having a certain thickness and area is used, a light source such as a fluorescent light is disposed right below the diffusive plate, and a surface of the diffusive plate emits light as the diffusive plate is directly irradiated with light from the light source. In the edge-light type illumination device, a light guiding plate formed of a plate having a certain thickness and area is used and a light source such as a fluorescent light or an LED is disposed on at least one side of the light guiding plate to cause a surface of the light guiding plate to emit light.

Of the direct type and the edge-light type illumination devices, the direct type illumination device has a structure in which a specific gap, i.e., a specific distance is provided between the light source and the diffusive plate. Thus, if the distance is short, the outer shape of the light source and the like may be projected on the diffusive plate to give unpleasant appearance and degrade the illumination quality. If a highly directional light source is used, uniform illumination light may not be obtained because the brightness of a portion of the diffusive plate right above the light source becomes extremely high to generate a difference in brightness between the portion and other illumination areas. As a method of uniformizing the brightness, a large distance may be provided between the diffusive plate and the light source. However, the use of this method may cause problems that desired illumination light cannot be obtained because the entire area proportionally becomes darker as the distance becomes larger, or the device cannot be made thin, for example. Such problems in the direct type illumination device make it difficult to employ the device depending on the use.

Because the direct type illumination device has the problems described above, the edge-light type illumination device is used instead of the direct type illumination devices and numerous illumination devices of this type have been proposed (see, for example, Patent Documents 1 to 3).

For example, an edge-light type illumination device is disclosed in Patent Document 1. The illumination device is configured by including an LED, a light guiding plate having a size of about a postcard in which a light guiding part is formed to have a flat surface, and a reflecting mirror that reflects light from the LED, installing the LED on the flat surface of the light guiding plate, and covering the LED with the reflecting mirror. Thus, the light emitted from the LED is reflected by the reflecting mirror to be guided to the light guiding plate. With the illumination device, the light emitted from the LED is efficiently taken into the light guiding plate.

An illumination device including a light source device formed of an LED and a light source rod, and a light guiding plate guiding the light emitted from the light source device is disclosed in Patent Document 2. The light source rod is formed of a prism array of a prescribed shape. The light source rod causes an irradiation target to be irradiated with the light emitted from the LED via the light guiding plate to uniformize the brightness.

Patent Document 3 discloses a register guide lamp in which a plurality of LEDs are disposed on a light entering surface of a light guiding body at an equal interval. Light from the LEDs is irregularly reflected by a reflector, and the irregularly reflected light causes plane emission of light by the light-emitting surface of the light guiding body, whereby a display body disposed facing the light-emitting surface of the light guiding body is illuminated.

PRIOR ART DOCUMENTS

Patent Documents

Patent Document 1: Japanese Patent Application Publication No. 2005-149848 (paragraph [0012], FIG. 1)
Patent Document 2: Japanese Patent Application Publication No. 2001-236811 (paragraphs [0012] to [0014], FIG. 1)
Patent Document 3: Japanese Patent Application Publication No. 2005-99406 (paragraphs [0016] and [0017], FIG. 3)

SUMMARY OF THE INVENTION

Problems to be Solved by the Invention

All of the illumination devices of Patent Documents 1 to 3 are edge-light type plane illumination devices using highly directional point light sources, namely LEDs. One or more LEDs are arranged along one or all sides of a rectangular-shaped light guiding plate so as to provide uniform illumination light from a light guiding surface.

However, this type of plane illumination device has the following problems. One of the problems is that it is difficult to increase the size of the illumination device because a relatively expensive light guiding plate with a certain thickness and size is required. For example, the illumination device of Patent Document 1 uses a glass or acryl plate of a size of a postcard as the light guiding plate, and it is thus difficult to increase the size any further. To somehow increase the size, a larger light guiding plate is required and moreover, a plurality of LEDs are required as disclosed in Patent Document 3, and these LEDs have to be disposed on light receiving surfaces on all sides of the light guiding plate. Thus, the weight of the illumination device increases, the number of parts increases to make the assembling operation cumbersome, and the cost rises. The illumination device of Patent Document 2 requires a specially shaped light source rod. It is difficult to increase the size even though such a light source rod is used.

Another problem is that, an increase in the size of the illumination device to increase the light-emitting area requires a larger light guiding plate proportionally. Such a light guiding plate is made of a thick glass or plastic plate, which is heavy. The illumination device including the light guiding plate therefore increases in weight and also the cost rises. Furthermore, the use of such a large light guiding plate makes the light path from the light source to the light-emitting surface long, resulting in greater attenuation of light. Thus, it is difficult to provide uniform illumination light and high-illuminance illumination light. To achieve high illuminance, a high-power light source is required, and thus the cost rises.

Still another problem is related to the above-described problem. Specifically, when the light source is disposed on one side of the light guiding plate as disclosed in Patent Documents 1 and 2, the light path from the light source to the light-emitting surface is long, resulting in greater attenuation of light. Thus, the size of the light guiding plate is limited and the increase in size cannot be achieved.

As described above, the conventional edge-light type illumination devices, which are configured by using the light guiding plate and disposing light sources at an area around the light guiding plate, are suitably used as a small-scale illumination device but can be increased in size only to a limited level. It is noted that, as a light source of a conventional technique, a light source device not illustrated is known in which a cup-shaped or a U-shaped reflective hood provided with a reflective surface on an inner wall is used, an LED is secured on a bottom portion of the reflective hood, and an irradiated surface is irradiated with irradiation light emitted from the LED and reflected by the reflective surface. Unfortunately, the irradiation range of the irradiation light, i.e., an illuminated area cannot be set with such a light source device. Naturally, the light source device cannot be used as a light source device in a large scale planar illumination device.

In view of the fact that the light guiding plate in the conventional edge-light type illumination devices fails to provide the plane illumination light for a large area, the present inventors have studied, on a trial and error basis, how the plane illumination light for a large area can be obtained without using the light guiding plate even when a highly directional light source is used. As a result, the present inventors have found that an irradiation area to be irradiated with the irradiation light can be set to a specific area, i.e., an illumination area by arranging a reflective plate, or so called a polarizing reflective plate that partly shields and reflects the irradiation light emitted from the LED to polarize the light to a specific direction, the reflective plate being tilted by a specific angle with respect to an optical axis on the vertical line extending from the light emitting point (surface) of the highly directional LED and through which the irradiation light with the highest intensity passes, i.e., the optical axis whose directivity angle is zero. Thus, the present invention is completed based on this finding.

Thus, an object of the present invention is to provide a light source device using a highly directional point light source and still allowing illumination with a desired illumination area set with an irradiation range not being concentrated on a specific portion but being appropriately dispersed to be implemented.

Another object of the present invention is to provide an edge-light type illumination device requiring no light guiding plate required in a conventional technique, improving the light utilization rate of the light source device, allowing uniform planar illumination over a wide area to be achieved, and being light in weight, even if a highly directional point light source such as an LED is used.

Means for Solving Problems

To solve the problems, a light source device of the invention according to claim 1 of the present application is characterized by including a highly directional point light source; a reflective hood that has a bottom portion on which the point light source is secured and a pair of side reflective portions opposing to each other extending outward from opposing sides of the bottom portion and having open end portions, an inner space of a specific volume defined by the bottom portion and the pair of side reflective portions inside, and an inner wall surface formed of a reflective surface; and a pair of first and second polarizing reflective plates that polarize irradiation light from the point light source to a specific direction. The first and the second polarizing reflective plates are each made of a plate material having a specific length and width and a high reflection rate on front and rear surfaces. At least one such point light source is secured on the bottom portion of the reflective hood. The first and the second polarizing reflective plates are tilted by a specific angle α with respect to an optical axis passing through the 0° direction angle of the point light source so that a specific gap is provided between the first and the second polarizing reflective plates and the reflective surface of the reflective hood, and a specific gap is provided between the first and the second polarizing reflective plates with the optical axis in between in such a manner that the gap is larger at a portion closer to the point light source and the gap is smaller at a portion farther from the point light source.

The light source device of the invention according to claim 2 of the present application is characterized in that the bottom portion and the pair of side reflective portions of the reflective hood extend in the longitudinal direction for a specific length. The point light source is provided in plurality on the extended bottom portion at specific intervals in the longitudinal direction. In the internal space, the point light sources are partitioned by partitioning reflective plates. The first and the second polarizing reflective plates are supported by the partitioning reflective plates.

The light source device of the invention according to claim 3 is characterized in that the first and the second polarizing reflective plates have end portions farthest from the point light source positioned within the gap of the reflective hood or protruding outward from the gap.

The light source device of the invention according to claim 4 is characterized in that the tilt angle α is in the range from 6 degrees to 30 degrees.

The light source device of the invention according to claim 5 is characterized in that the reflective hood is formed of a reflective material that has a high light reflection rate and irregularly reflects light. The first and the second polarizing reflective plates and the partitioning reflective plates are each formed of a reflective material having a high light reflection rate and low light absorption and transmission rates and irregularly reflecting light.

The light source device of the invention according to claim 6 is characterized in that the reflective hood, the first and the second polarizing reflective plates, and the partitioning reflective plates are each formed of an ultrafinely foamed light reflective material.

The light source device of the invention according to claim 7 is characterized in that the point light source is a light emitting diode or laser diode made of a single light emitting element or an assembly of a plurality of light emitting elements.

An illumination device of the invention according to claim 8 is characterized by including two, i.e., first and second light diffusive members having a rectangular shape with a specific width and length arranged opposing to each other with a specific gap provided therebetween, and the light source device according to any one of claims 1 to 7 provided in a gap between end sides of the first and the second light diffusive members on at least one side.

The illumination device of the invention according to claim 9 is characterized in that in the first and the second light diffusive members, a light reflection rate is set to be higher at a portion on a side closer to the point light source and gradually lower toward the other side farther from the point light source, whereas a light transmission rate is set to be lower at a portion on the side closer to the point light source and gradually higher toward the other side farther from the point light source.

The illumination device of the invention according to claim 10 is characterized in that any one of the first and the second light diffusive members is a reflective plate.

Effects of the Invention

According to the invention of claim 1, even when the highly directional point light source is used, illumination with a desired illumination area set with an irradiation range not being concentrated on a specific portion but being appropriately dispersed can be implemented. Specifically, the illumination area is set by setting the tilt angle of the first and the second polarizing reflective plates.

More specifically, when light is emitted from the point light source, the direct light from the point light source, reflection light reflected by the inner wall surface of the reflective hood, and reflection light reflected by the polarizing reflective plates pass through the gap between the first and the second polarizing reflective plates and the irradiation area (illumination area) is set in accordance with the tilt angle of the first and the second polarizing reflective plates. Moreover, an area closest to the point light source can be prevented from being dark and can have substantially the same illuminance with other areas because the specific gap is provided between the first and the second polarizing reflective plates and the reflective surface of the reflective hood.

According to the invention of claim 2, the cells defined by the partitioning reflective plates are formed in the internal space of the reflective hood and the light from the point light source is reflected in each of the cells. Thus, the illuminances of the adjacent cells can be substantially uniformized.

According to the invention of claim 3, the illumination range can be controlled in accordance with the shape of the first and the second polarizing reflective plates.

According to the invention of claim 4, the irradiation area (illumination area) can be set with the tilt angle α set in the range from 6 degrees to 30 degrees.

According to the invention of claim 5, the reflective hood is formed of a reflective material having a high light reflection rate and irregularly reflecting light. The first and the second polarizing reflective plates and the partitioning reflective plates are each formed of a reflective material having a high light reflection rate and low light absorption and transmission rates, and irregularly reflecting light. Thus, light can be efficiently reflected and thus the utilization rate of light is improved.

According to the invention of claim 6, the ultrafinely foamed light reflective material is used. Thus, the material can be easily obtained and processed.

According to the invention of claim 7, the light emitting diode or the laser diode is used as the point light source. Thus, long service life and low power consumption can be achieved to save energy.

According to the invention of claim 8, the light guiding plate required in the conventional technique is not required. Thus, weight and cost can be reduced and uniform plane illumination light for a large area can be obtained. More specifically, the weight and the cost can be reduced because the light guiding plate is not used.

According to the invention of claim 9, a high light reflection rate and low light transmission rate of the light diffusive members are set at a portion on the side close to the point light source, whereas a lower light reflection rate and higher light transmission rate of the light diffusive members are set on the side far from the point light source than those on the close side. Thus, illumination light of a uniform illumination distribution can be obtained over the entire area of a light emitting surface of the illumination device.

According to the invention of claim 10, any one of the first and the second light diffusive members is a reflective plate. Thus, an illumination device with which illumination light can be obtained from a single surface can be manufactured, whereby the device can be used for wider applications.

BRIEF DESCRIPTION OF THE DRAWINGS

FIG. 10A is a cross-sectional view of the light diffusive member taken along the longitudinal direction, FIG. 10B is a plan view of a diffusive sheet attached on the light diffusive member, and FIG. 10C is a modification of the diffusive sheet of FIG. 10B.

BEST MODE(S) FOR CARRYING OUT THE INVENTION

Embodiments of the present invention are described below with reference to the accompanying drawings. It is noted that the embodiments described below present, by way of example, a light source device embodying the technical idea of the present invention and an illumination device using this light source device. The present invention is not intended to be limited to the embodiments and is equally applicable to other embodiments falling within the scope of the appended claims.

Figure 1:
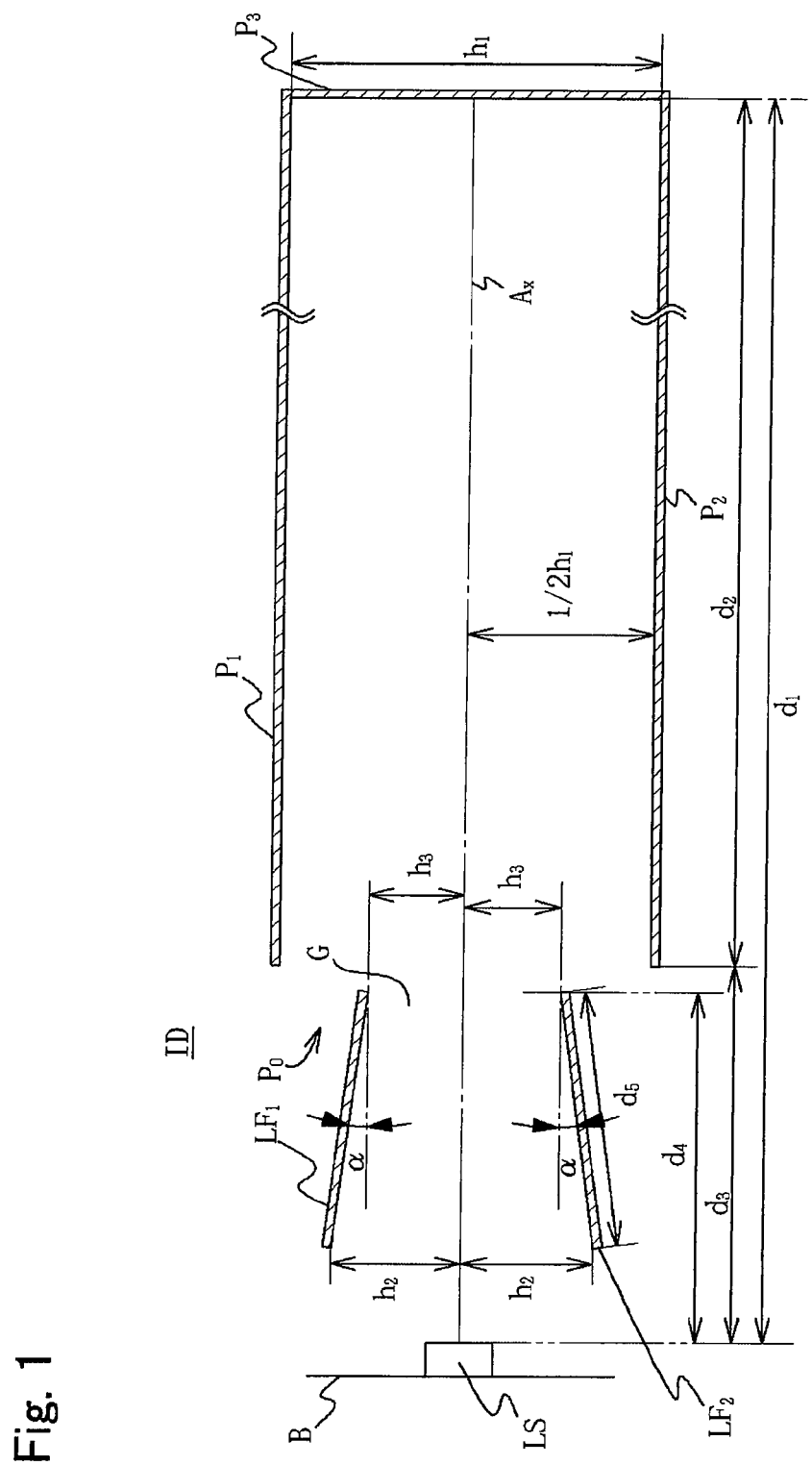
FIG. 1 is a schematic cross-sectional view of an illumination device for explaining an illumination technique employed in an illumination device of the present invention.
Figure 2:
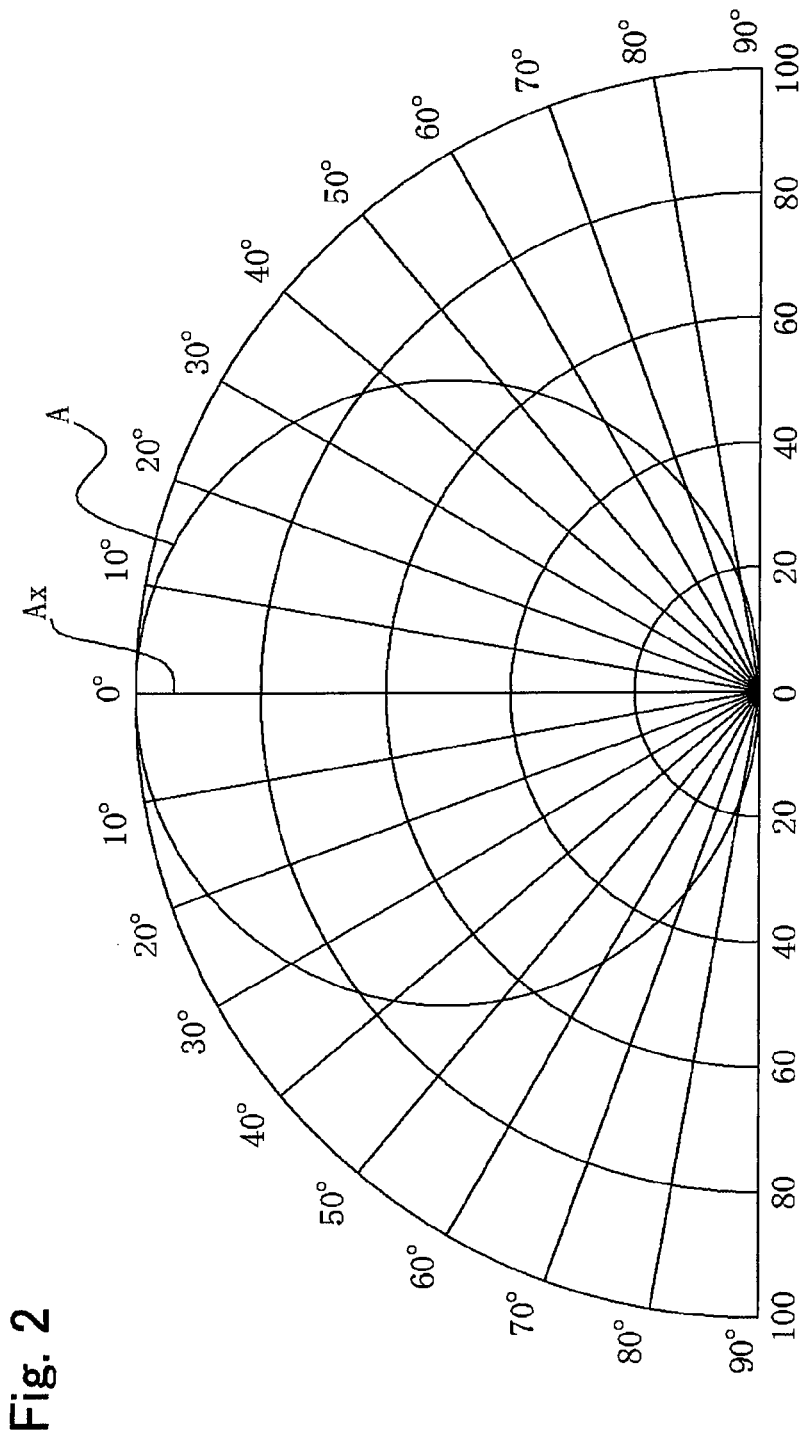
FIG. 2 is a light distribution characteristic chart of a light emitting diode used in the illumination technique of FIG. 1.

Firstly, a lighting technique employed in an illumination device according to the present invention is described with reference to FIG. 1. FIG. 1 is a schematic cross-sectional view of an illumination device for explaining the illumination technique employed in the illumination device of the present invention. FIG. 2 is a light distribution characteristic chart of a light emitting diode used in the illumination technique of FIG. 1.

The illumination technique of the illumination device of the present invention is implemented using an illumination device ID. The illumination device ID is configured by including a highly directional light source LS, e.g., an LED, a pair of first and second polarizing reflective plates $LF_1$ and $LF_2$ located at positions apart from the LED for a specific distance, having a specific length and width, and disposed opposing to each other with a specific gap G provided therebetween, and a pair of first and second light diffusive members $P_1$ and $P_2$ that are disposed opposing to each other and provided at one end portion of each of the first and the second polarizing reflective plates, i.e., an end of each of the first and the second polarizing reflective plates on the side far from the light source LS. The pair of first and second polarizing reflective plates $LF_1$ and $LF_2$ are fixed to be tilted by a specific angle α with respect to an optical axis Ax shown in FIG. 1.

The pair of first and second polarizing reflective plates $LF_1$ and $LF_2$ are tilted at the specific angle α with respect to the optical axis Ax with the gap G provided between the polarizing reflective plates. Thus, the irradiation light from the light source LS partly passes straight through the gap G directly and is partly shielded and reflected by the pair of first and second polarizing reflective plates $LF_1$ and $LF_2$. Thus, the illumination areas on the pair of first and second light diffusive members $P_1$ and $P_2$ opposing to each other are set to be dispersed to a specific range and the illumination areas are irradiated with the light. As a result, uniform plane illumination light with no difference in brightness can be obtained on surfaces of the light diffusive members $P_1$ and $P_2$.

The LED of the light source LS is formed by a single light-emitting element or by assembling a plurality of light-emitting elements and is fixed on a mounting base B having a flat surface. As illustrated in FIG. 2, this LED has substantially spherical light distribution characteristics in which the light is radiated from a light emitting point or a light emitting surface of the LED in 360-degree direction and the light converges at a point away from the light emitting point. More specifically, the LED has a light distribution curve as represented by a reference numeral A in the range from 0° to 90° of angle on both sides centering on the light emitting center point (surface) 0 of the LED and starting from the zero degree) (0°) vertical line passing through the center point. The light distribution curve A draws a spherical curve that spreads in radiation direction, i.e., in 360-degrees direction from the light emitting surface (plane) 0. The light passing through the optical axis Ax whose directivity angle is zero degree (0°) has the highest intensity. In FIG. 1, the optical axis Ax extends along and between the pair of opposing light diffusive members.

The first and the second polarizing reflective plates $LF_1$ and $LF_2$ have the same configuration. Specifically, as illustrated in FIG. 1, the polarizing reflective plates are each formed of a reflective plate of a substantially rectangular shape with a specific length $d_5$ extending along the optical axis Ax and a width extending for a specific length in the direction orthogonal to the width direction, the reflective plate having a high reflection rate on the front and the rear surfaces. As the reflective plate, the one that not only performs total reflection but also performs irregular reflection is preferably used.

The pair of polarizing reflective plates $LF_1$ and $LF_2$ are arranged opposing to each other in such a manner that a distance between their end portions close to the light source LS is large, i.e., a gap $h_2$ is provided between one of these end portions and the optical axis, and the distance between their end portions far from the light source LS is small, i.e., a gap $h_3$ ($h_2 > h_3$) is provided between one of these end portions and the optical axis. With this arrangement, the pair of polarizing reflective plates are tilted by the specific angle α with respect to the optical axis Ax. The angle α, which has been described to be the same for the pair of polarizing reflective plates, may be different for each of the pair of polarizing reflective plates.

The pair of first and second polarizing reflective plates $LF_1$ and $LF_2$ are provided with the gap G therebetween, and are tilted by the specific angle α with respect to the optical axis Ax. Thus, the irradiation light from the light source LS partly passes straight through the gap G directly, and is partly shielded and reflected by the pair of polarizing reflective plates $LF_1$ and $LF_2$, whereby the illumination area of each of the pair of first and second light diffusive members $P_1$ and $P_2$ opposing to each other is set to be dispersed to a specific range.

The first and the second light diffusive members $P_1$ and $P_2$ are respectively formed of a pair of first and second light diffusive members that have a specific length $d_2$ extending along the optical axis Ax for a specific length and have a width and are opposing to each other with a specific gap $h_1$ provided therebetween. The light diffusive members $P_1$ and $P_2$ are arranged substantially in parallel with each other with the gap $h_1$ provided therebetween and with their end portions farthest from the light source connected by a bottom reflective member $P_3$. The end portions of the first and the second light diffusive members $P_1$ and $P_2$ in the width directions are connected by a similar light diffusive member. Accordingly, the first and the second light diffusive members $P_1$ and $P_2$ form a flat box-shaped body with the rear portion connected by the bottom reflective member $P_3$, both sides in the longitudinal direction surrounded by the light diffusive member, and an opening $P_0$ formed on the front side. The pair of polarizing reflective plates $LF_1$ and $LF_2$ have one of their end portions disposed at a portion outward of the opening $P_0$ of the box-shaped body. Light diffusive members from which the first and the second light diffusive members $P_1$ and $P_2$ are formed are made of a material with a specific light transmission rate and light reflection rate and a low light absorption rate in addition to the irregular reflection, i.e., diffusing property.

The light diffusive members are formed of a light reflection/transmission plate of which the light reflection rate and the light transmission rate vary in accordance with the distance from the LED. Specifically, the light reflection rate is set to be high at a portion close to the LED and gradually lower toward the other side farther from the LED. On the other hand, the light transmission rate is set to be low at a portion close to the LED. The light reflection/transmission plate is preferably formed of a material that irregularly reflects light.

Figure 3:
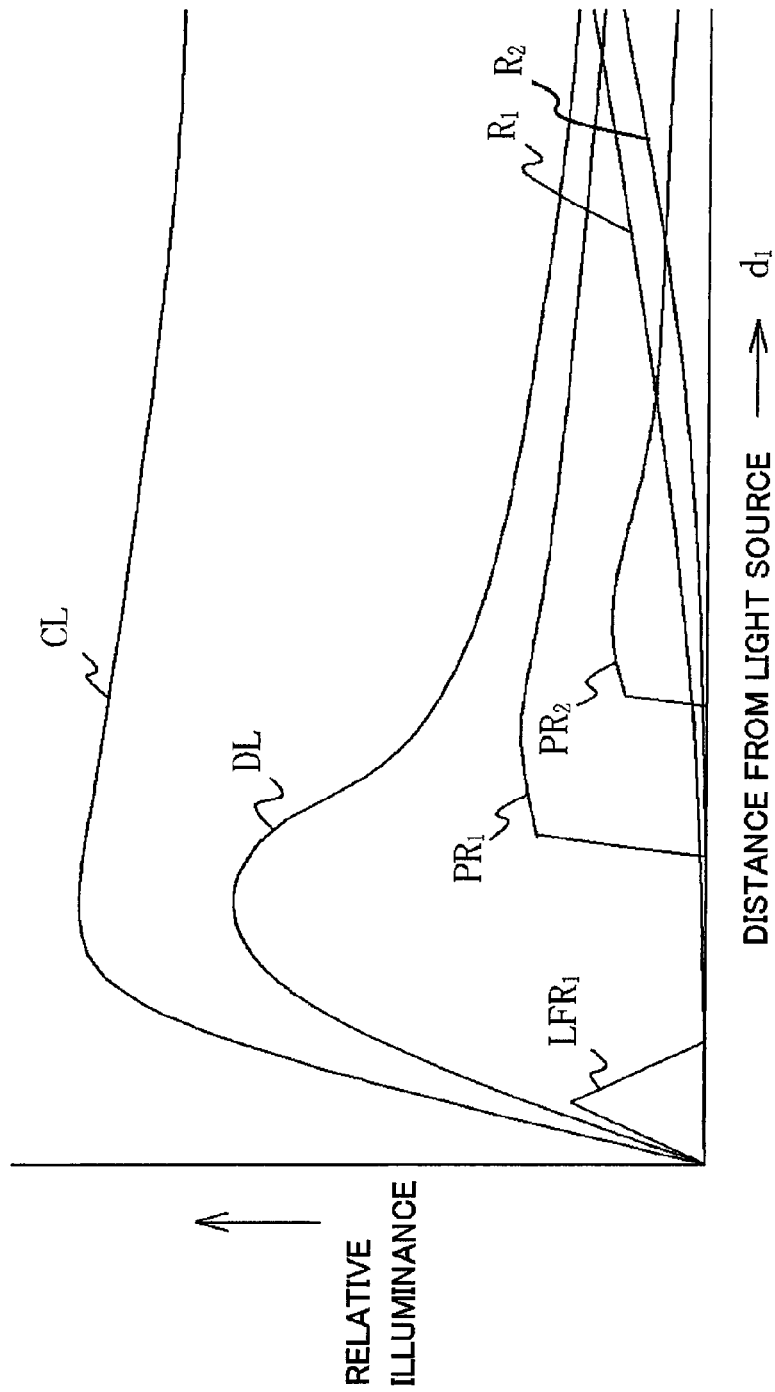
FIG. 3 is a diagram of an illumination distribution curve obtained as a result of simulating an illumination distribution on a light diffusive member surface in the illumination technique of FIG. 1.

An illuminance distribution is simulated under the following conditions using the illumination device ID. Results of the simulation are described with reference to FIG. 3. FIG. 3 is a diagram of an illuminance distribution curve obtained as a result of simulating an illuminance distribution on a light diffusive member surface in the illumination device of FIG. 1. The illuminance distribution curve in this diagram is obtained by a measurement on a surface of one of the first and the second light diffusive members. The illuminance on the other light diffusive member forms the same illuminance distribution curve.

The illuminance simulation of the illumination device ID is performed under the following conditions:
the reflection rate $a_1$ of the polarizing reflective plates $LF_1$ and $LF_2$: 0.95;
the reflection rate $a_2$ of the bottom reflective member: 0.95;
the transmission rate $b_1$ of the light diffusive members: 0;
the $\Delta$ transmission rate $b_2$ of the light diffusive members: 0.02;
the reflection rate $a_4$ of the light diffusive members: 0.96;
the absorption rate $c_1$ of the light diffusive members: 0.04;
the amount of light F (lm) of the LED: 80;
the angle $\alpha$ (degrees) of the polarizing reflective plates $LF_1$ and $LF_2$: 30;
the distance $d_4$ from the light source LS to an end portion of each of the polarizing reflective plates $LF_1$ and $LF_2$: 36 mm;
the gap $h_3$ between the optical axis Ax and the end portion of each of the polarizing reflective plate at the end portion of the polarizing reflective plate: 6 mm;
the length $d_5$ of the polarizing reflective plates $LF_1$ and $LF_2$: 20 mm;
the distance $\frac{1}{2} \times h_1$ between the optical axis Ax and one of the light diffusive members: 36 mm;
the distance $d_3$ from the light source LS to the tip of each of the light diffusive members $P_1$ and $P_2$: 37 mm; and
the distance $d_1$ from the light source LS to the bottom reflective member: 530 mm.

The illuminance distribution in FIG. 3 was obtained by measuring the illuminance on the surface of one of the light diffusive members with the illumination device ID set to the above conditions and an LED with light intensity of 80 lm used for the light source LS. Specifically, direct light DL is emitted from the LED of the light source LS. As illustrated in FIG. 3, this direct light has an illuminance peak point at a portion close to the LED and the illuminance is attenuated after the peak. More specifically, an illuminance curve is drawn in which the illuminance rises sharply from the LED toward the peak point and after passing the peak point, the illuminance is gradually attenuated toward the bottom reflective member of the light diffusive member. This direct light DL is reflected once or a plurality of times by the first and the second light diffusive members opposing to each other. Reflection light reflected by one light diffusive member $P_1$ is described below. Reflection light reflected by the other light diffusive member $P_2$ is the same. The direct light DL is reflected on one of the light diffusive members, whereby single-time reflection light $PR_1$ reflected once and two-time reflection light $PR_2$ reflected twice are obtained. Although omitted from the drawing, three-time reflection light reflected three times, four-time reflection light reflected four times, five-time reflection light reflected five times, and so on can be obtained thereafter.

Moreover, the direct light DL is reflected on the bottom reflective member $P_3$ whereby bottom reflection light $R_1$ can be obtained. Furthermore, bottom reflection light $R_2$ that is the direct light reflected by the light diffusive member once and then reflected by the bottom reflective member $P_3$, as well as polarizing reflective plate single-time reflection light that is the direct light reflected by a polarizing reflective plate once, single-time reflection light that is the polarizing reflective plate single-time reflection light reflected by the light diffusive member once, two-time reflection light that is the polarizing reflective plate single-time reflection light reflected by the light diffusive member twice, polarizing reflective plate two-time reflection light, and the like omitted from the drawing can be obtained. Combined illuminance CL illustrated in FIG. 3 is an illuminance obtained by combining all these light beams, i.e., the direct light DL, the reflection light beams $PR_1$ and $PR_2$, the reflection light beams thereafter, and the like. As illustrated in FIG. 3, the polarizing reflective plate is a reflective plate that controls the irradiated light from the LED so that the irradiated light can reach an area far away from the LED to uniformize the illuminance distribution on the irradiated area.

As a result of the simulation of the illuminance distribution, the combined illuminance CL draws a substantially flat curve regardless of the distance from the light source LS. To be precise, the combined illuminance CL slightly lowers as it gets farther from the light source. Still, the curve is substantially flat and substantially uniform illumination light can be obtained on a radiation surface of one of the light diffusive materials. The curve of the combined illuminance CL is flat especially compared with the curve of the direct light DL. Substantially uniform illumination light can be obtained also on the radiation surface of the other light diffusive member.

This illuminance simulation was performed under the above conditions, especially with the angle $\alpha$ of the light diffusive reflective plates $LF_1$ and $LF_2$ set to 30 degrees. By changing the conditions, uniform illumination light can be obtained over a large area with the combined illuminance CL set to a desired value.

The desired combined illuminance CL was obtained in the experiments in which the angle $\alpha$ was changed in the range from 6 degrees to 30 degrees without setting it to 0 degree. A change in the conditions other than the angle $\alpha$, e.g., the light amount of the light source, the length of the polarizing reflective plates, relationship between the polarizing reflective plates and the optical axis, the length of the light diffusive members, and the like requires a change in the angle $\alpha$. Thus eventually, the desired combined illuminance CL can be obtained by adapting the angle to the other conditions. In the illumination device ID, the polarizing reflective plates and the light diffusive members are connected and thus, the light diffusive members may be dark at a portion near the connection portion. Thus, in an illumination device according to an embodiment of the present invention described below, the area is prevented from being dark by disposing a reflective member at an area on the outer side of the polarizing reflective plates, i.e., a side on which the pair of polarizing reflective plates are not facing each other. $LFR_1$ in FIG. 3 represents reflection light reflected by the reflective member and by the outer side of the polarizing reflective plates.

Figure 4:
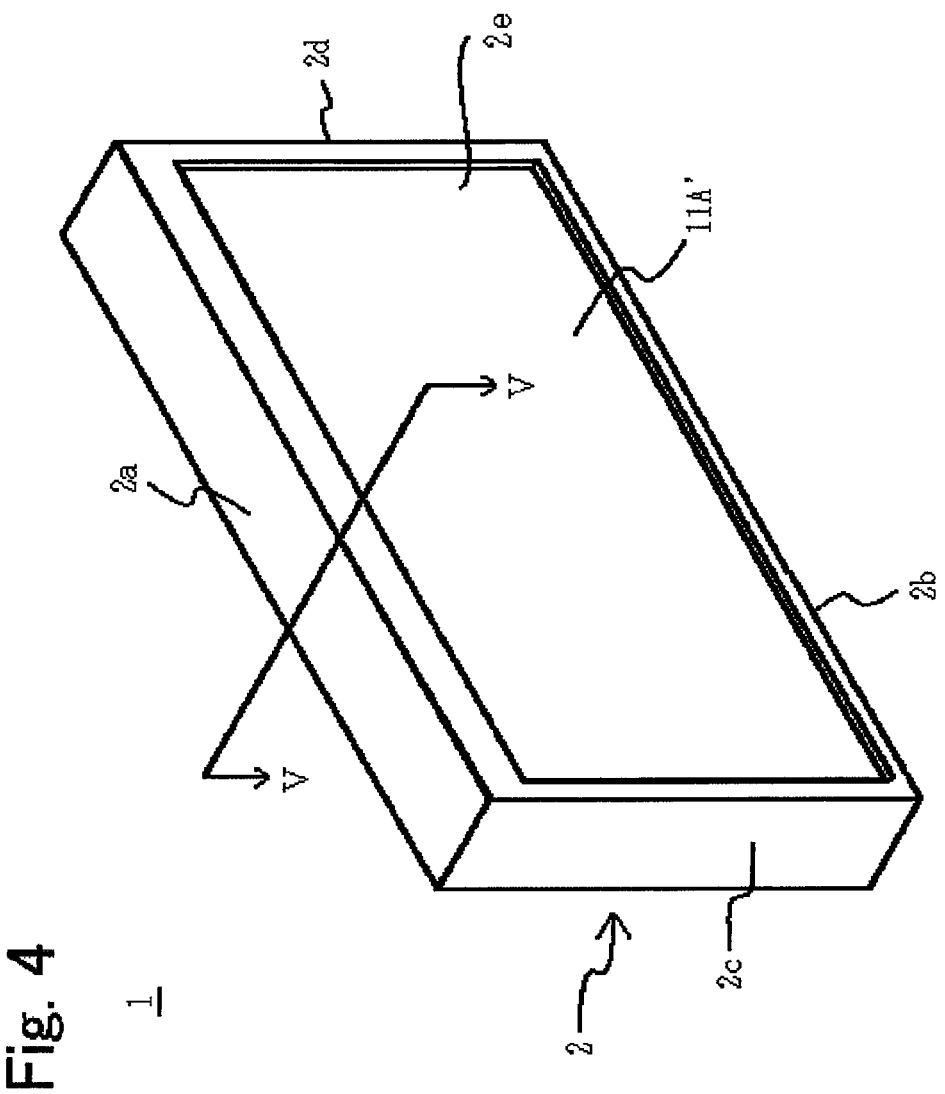
FIG. 4 is a perspective view of an illumination device according to a first embodiment of the present invention.
Figure 5:
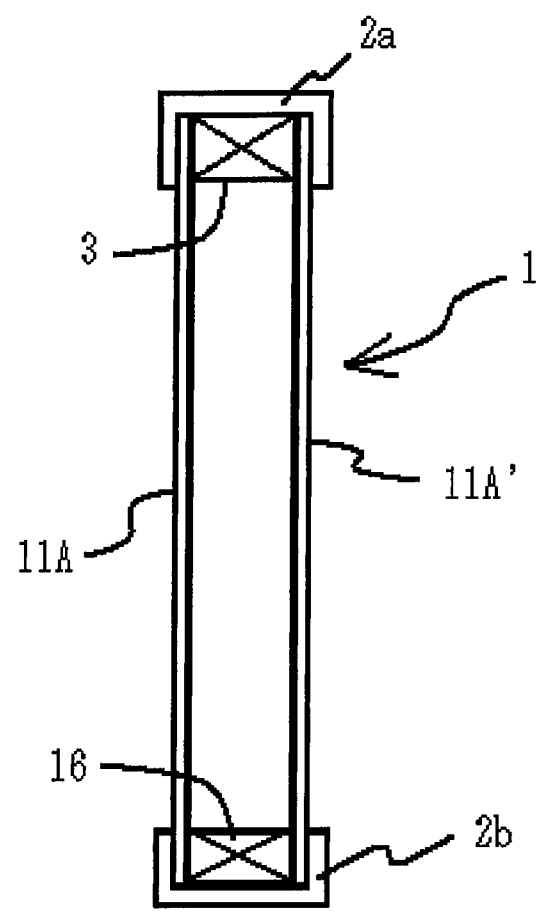
FIG. 5 is a schematic cross-sectional view of the illumination device of FIG. 4 taken along the line V-V.

The illumination device according to a first embodiment of the present invention is described below with reference to FIG. 4 to FIG. 10. The above-described illumination technique is employed in the illumination device. FIG. 4 is a perspective view of the illumination device according to the first embodiment of the present invention. FIG. 5 is a schematic cross-sectional view of the illumination device in FIG. 4 taken along the line V-V.

Firstly, an overview of the illumination device according to the first embodiment of the present invention is described with reference to FIG. 4 and FIG. 5.

As shown in FIG. 4 and FIG. 5, the illumination device 1 includes: a frame 2 of a frame-like shape having a pair of opposing long side frames 2a, 2b and a pair of opposing short side frames 2c, 2d and being provided with a window 2e of a specific size therein; a pair of light diffusive members 11A and 11A' fitted in the window; a light source device 3 provided in the long side frame 2*a*; and opposing side equipment 16 provided in the long side frame 2*b* facing the light source device 3. The frame 2 of a frame-like shape has a width and length that are large enough to incorporate the light source device 3, the opposing side equipment 16, and the light diffusive members 11A and 11A' within the frame sides and is formed of a synthetic resin mold or a metal plate material. The opposing side equipment 16 is any one of a light source device same as the light source device 3, a reflective plate, and a power source device for the light source device 3. If the opposing side equipment 16 is a light source device, the illumination device is provided with the light source devices on the upper and lower sides in the state of FIG. 4, whereby illumination light for a large area can be obtained and illuminance can be increased. If the opposing side equipment 16 is a reflective plate, the utilization rate of light can be improved. If the opposing side equipment 16 is a power source device, the illumination device can be downsized because the device is incorporated in the frame.

Figure 6:
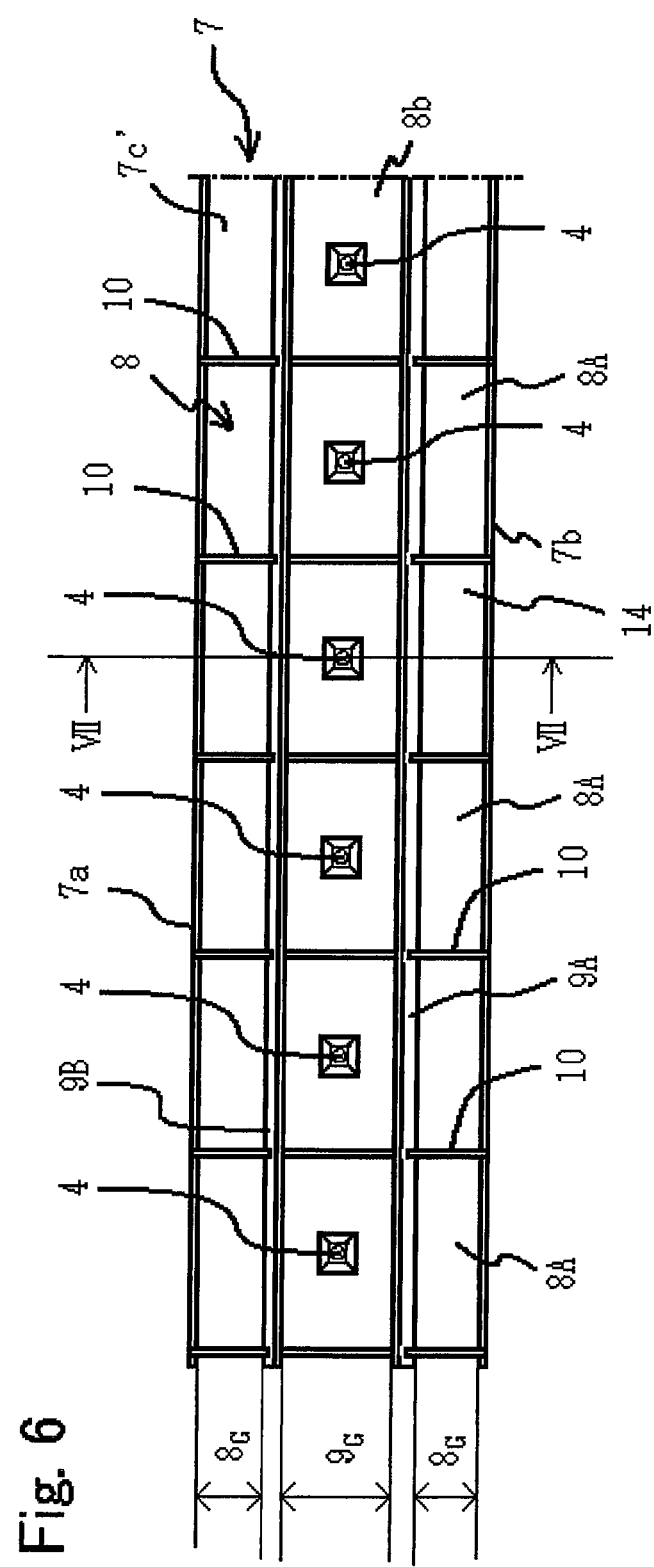
FIG. 6 is a schematic rear view of a light source device incorporated in the illumination device of FIG. 4.
Figure 7:
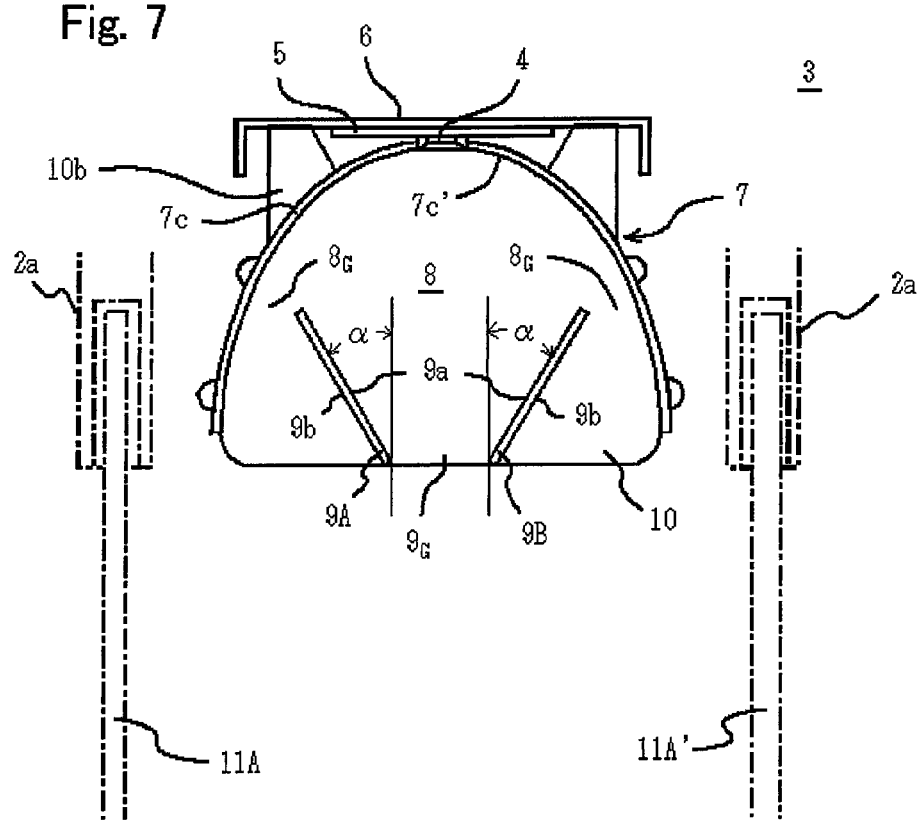
FIG. 7 is a schematic cross-sectional view of the light source device of FIG. 6 taken along the line VII-VII.
Figure 8:
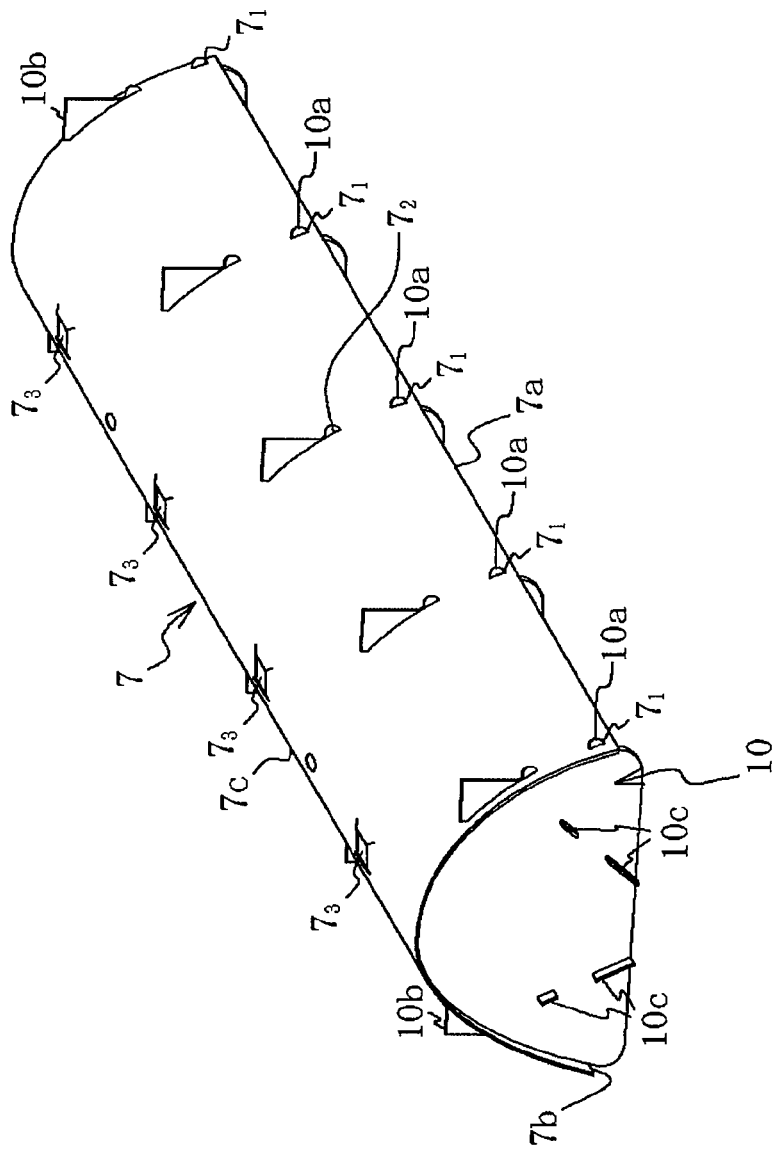
FIG. 8 is a perspective view of an outer appearance of the light source device of FIG. 6.
Figure 9:
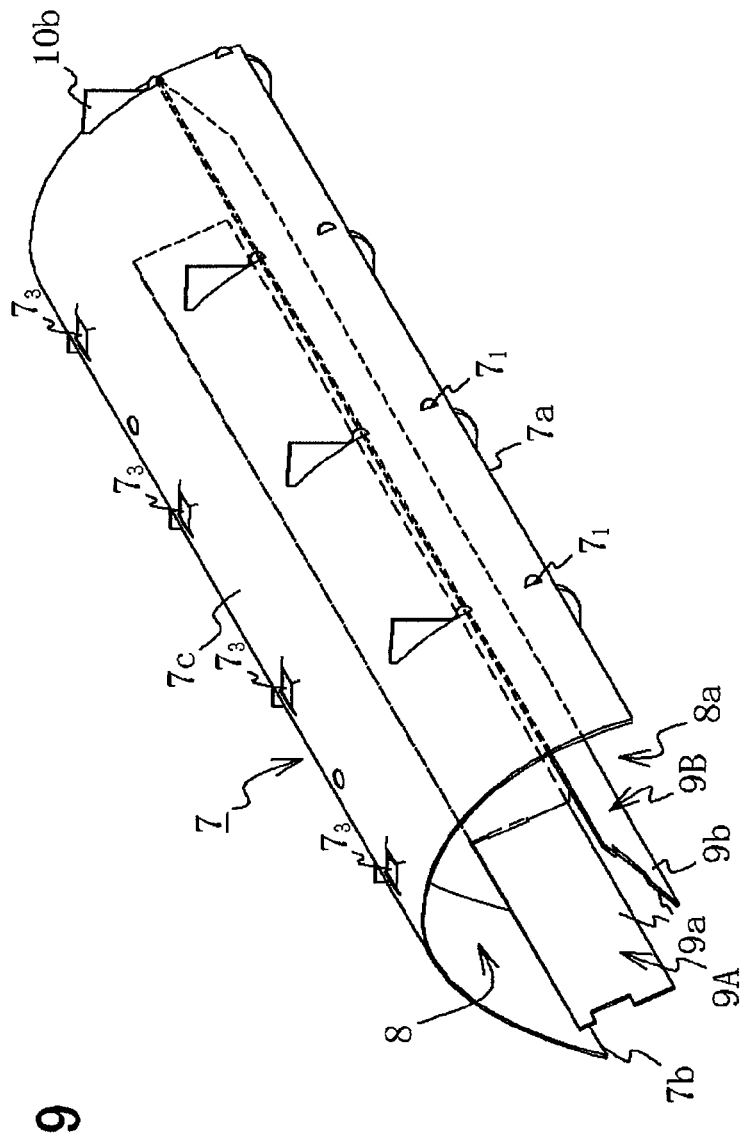
FIG. 9 is a perspective view of the light source device of FIG. 8 with an end portion partly cut away.

Next, the light source device is described with reference mainly to FIG. 6 to FIG. 9. FIG. 6 is a schematic rear view of the light source device. FIG. 7 is a schematic cross-sectional view of the light source device of FIG. 6 taken along the line VII-VII. FIG. 8 is a perspective view of an outer appearance of the light source device of FIG. 6 (LEDs are omitted in the figure). FIG. 9 is a perspective view of the light source device of FIG. 8 with an end portion partly cut away.

As illustrated in FIG. 6 and FIG. 7, the light source device 3 includes a plurality of LEDs 4, an arch-shaped reflective hood 7 that is provided with the LEDs and reflects a part of the irradiation light from the LEDs to a specific direction, and a pair of first and second polarizing reflective plates 9A and 9B that polarize the irradiation light from the LEDs 4 to a specific direction. The polarizing reflective plates are fixed by partitioning reflective plates 10 that partitions the plurality of LEDs 4 on the arch-shaped reflective hood 7. Among the reflective hood 7, the polarizing reflective plates 9A and 9B, and the partitioning reflective plates 10, the reflective plate 7 is made of a material that has a low light absorption rate and high light reflection rate and irregularly reflects light. The first and the second polarizing reflective plates 9A and 9B and the partitioning reflective plates 10 are each made of a material that has a low light absorption rate and has a high light reflection rate (including irregular reflection) and low light transmission rate on both surfaces. The reflective hood 7, the first and the second polarizing reflective plates 9A and 9B, and the partitioning reflective plates 10 are each made of an ultrafinely foamed light reflective material for example. Among ultrafinely foamed light reflective materials, the one having the characteristics of light transmission rate 1%, reflection rate 98%, and light absorption rate 1% is preferable. If the reflective hood 7, the first and the second polarizing reflective plates 9A and 9B, and the partitioning reflective plates 10 are formed of the same material, the material can be obtained and processed easily compared with a case in which different materials are used. Naturally, each of the reflective hood 7, the first and the second polarizing reflective plates 9A and 9B and the partitioning reflective plates 10 may be formed by applying different materials, such as emulsified particles of titanium white or emulsified particles of polytetrafluoroethylene on a member instead of applying a single material.

The plurality of LEDs 4 is each formed of a single light emitting element or by assembling a plurality of light emitting elements. Moreover, LEDs that emit light of the three primary colors, i.e., R, G, and B can be used as the LEDs 4. Although the LEDs are used in this embodiment, other light sources, for example, laser diodes and the like can also be used. A lens may be attached to the light emitting part of each LED or laser diode. The LEDs 4 are secured on a mounting base 5 having a flat surface at substantially equal intervals in accordance with the partitioning of the reflective hood 7 described later. As shown in FIG. 7, the mounting base 5 is fixed on the long side frame 2*a* of the frame 2 using a mounting member 6.

As shown in FIG. 6 to FIG. 9, the reflective hood 7 includes a bottom portion of a specific size, and a pair of opposing side reflective portions that extend from opposing sides of the bottom portion for a specific length. A specific gap is provided between the top sides of the respective side reflective portions. Thus, the reflective hood 7 is formed of an arch-shaped reflective plate of which the inner surfaces of the bottom surface and the side reflective portions are formed to be reflective surfaces. Specifically, the reflective hood 7 includes a pair of long sides 7*a* and 7*b* opposing to each other with a specific space provided therebetween, and a curved portion 7*c* extending from one long side to the other long side while curving into a substantially semicircular shape, and thus is formed of an arch-shaped reflective plate as a whole. The reflective hood 7 has a suitable size to be incorporated in the long side frame 2*a* of the frame 2. The space between the pair of long sides 7*a* and 7*b* is shorter than the width of the long side frame 2*a* and the length of the space is slightly shorter than that of the long side frame 2*a*.

Because the curved portion 7*c* is curved into a substantially semicircular shape, a space 8 of a specific volume defined by a gap opening between the pair of long sides 7*a* and 7*b* and the curved portion 7*c* is formed in the reflective hood 7. The space 8 includes a gap opening 8*a* (see FIG. 9) formed between the pair of long sides 7*a* and 7*b*, and an inner surface 7*c*', i.e., an arch-shaped ceiling surface is formed of a reflective surface. The pair of first and second polarizing reflective plates 9A and 9B to be described later are incorporated in the space 8. The reflective hood 7 is partitioned so that the plurality of LEDs 4 is disposed at substantially equal intervals in the longitudinal direction. At each of the partitioning portions, a plurality of mounting grooves $7_1$ and $7_2$ by which the partitioning reflective plates 10 are mounted is provided at the arch-shaped curved portion 7*c* as shown in FIGS. 7 to 9. Of the mounting grooves, the mounting groove $7_1$ is a groove in which a corresponding latching craw 10*a* of the partitioning reflective plates 10 is inserted and the mounting groove $7_2$ is a groove in which a corresponding mounting piece 10*b* is inserted. The reflective hood 7 is provided with the partitioning reflective plates 10 on both ends in the longitudinal direction. Thus, the reflective hood 7 is provided with mounting grooves therefor as well. In each partitioned space, an opening $7_3$ of a specific size from which the light emitting portion of an LED is exposed is provided at a center top portion of the arch-shaped curved portion 7*c*.

Because the pair of first and second polarizing reflective plates 9A and 9B have the same configuration, one of the polarizing reflective plates is described.

As shown in FIG. 6 to FIG. 9, the polarizing reflective plate 9A is formed of a plate-like body having a specific width and length. The polarizing reflective plate has a length substantially the same as that of the reflective hood 7 and such a width that when the polarizing reflective plate is fixed to the reflective hood 7, a specific gap is provided between the polarizing reflective plate and the arch-shaped ceiling surface. A front surface 9*a* and a rear surface 9*b* of the polarizing reflective plate 9A are each formed of a reflective surface having a high light reflection rate (including irregular reflection). As illustrated in FIG. 7, the pair of first and second polarizing reflective plates 9A and 9B are fixed in the reflective hood 7 to be tilted by the specific angle α with respect to the optical axis Ax. The polarizing reflective plates 9A and 9B are fixedly mounted by the partitioning reflective plates 10. The optical axis Ax in FIG. 7 is an optical axis extending vertically downward from the LED 4 in this figure shifted in the horizontal directions.

As illustrated in FIG. 8 and FIG. 9, each partitioning reflective plate 10 is formed of a thin reflective plate having a shape to block the space 8 of the reflective hood 7 by the side surfaces, i.e., a semicircular shape. The partitioning reflective plate 10 is provided with the plurality of latching craws 10a to be inserted in the respective mounting grooves $7_1$ of the reflective hood 7 and the plurality of mounting pieces 10b to be fixed to the respective mounting member 6 on the semicircular arc side. The partitioning reflective plate 10 is provided on the flat surface of the plate with the mounting grooves 10c by which the pair of first and second polarizing reflective plates 9A and 9B are fixed at the specific angle α. The front and the rear surfaces of the partitioning reflective plate 10 are each a reflective surface having a high light reflection rate (including irregular reflection).

The light source device 3 is assembled as follows. A polarizing reflective plate assembly is formed by using the plurality of partitioning reflective plates 10. Specifically, the partitioning reflective plates 10 are fixed on the pair of first and second polarizing reflective plates 9A and 9B at specific intervals. Then, the polarizing reflective plate assembly is inserted in the space 8 of the reflective hood 7 and the latching craws 10a and the mounting pieces 10b of the plurality of partitioning reflective plates 10 are respectively inserted in the mounting grooves $7_1$ and $7_2$ of the reflective hood 7 to be fixed. Thereafter, the assembling of the light source device 3 is completed by securing the LEDs 4 in the respective openings $7_3$ of the reflective hood 7. This assembling of the light source device 3 provides a configuration in which a plurality of cells 8A (see FIG. 6) each partitioned by a pair of opposing partitioning reflective plates 10 is formed in the space 8 of the reflective hood 7, and one LED 4 is located on a central portion of the ceiling surface of each of the cells 8A.

As illustrated in FIG. 6 and FIG. 7, in the light source device 3, the pair of first and second polarizing reflective plates 9A and 9B are disposed in the space 8 of the reflective hood 7 while being tilted by the specific angle α, a gap $9_G$ is provided between the polarizing reflective plates 9A and 9B at a portion of the gap opening 8a of the space 8, and a gap $8_G$ is provided between each of the other ends of the polarizing reflective plates 9A and 9B and the inner surface of the reflective hood 7 in the space 8. The light source device 3 has the plurality of cells 8A in the space in the reflective hood 7. Thus, irradiation light from the LED 4 in each of the cells is reflected by the inner surface of the cell, i.e., by the reflective surfaces of the reflective hood 7 and the partitioning reflective plates 10 and then is emitted through the gap opening 8a of the space 8. With this irradiation light, the illuminances of the adjacent cells 8A near the gap opening 8a are substantially uniform. Without the partitioning by the partitioning reflective plates, illuminance around the partitioned portion is lower than other portions, whereby the illuminance is not uniform. The light source device 3 has the pair of polarizing reflective plates 9A and 9B and the like incorporated in the space of the arch-shaped reflective hood 7, and thus can be manufactured to have a small and space-saving size.

Figure 10:
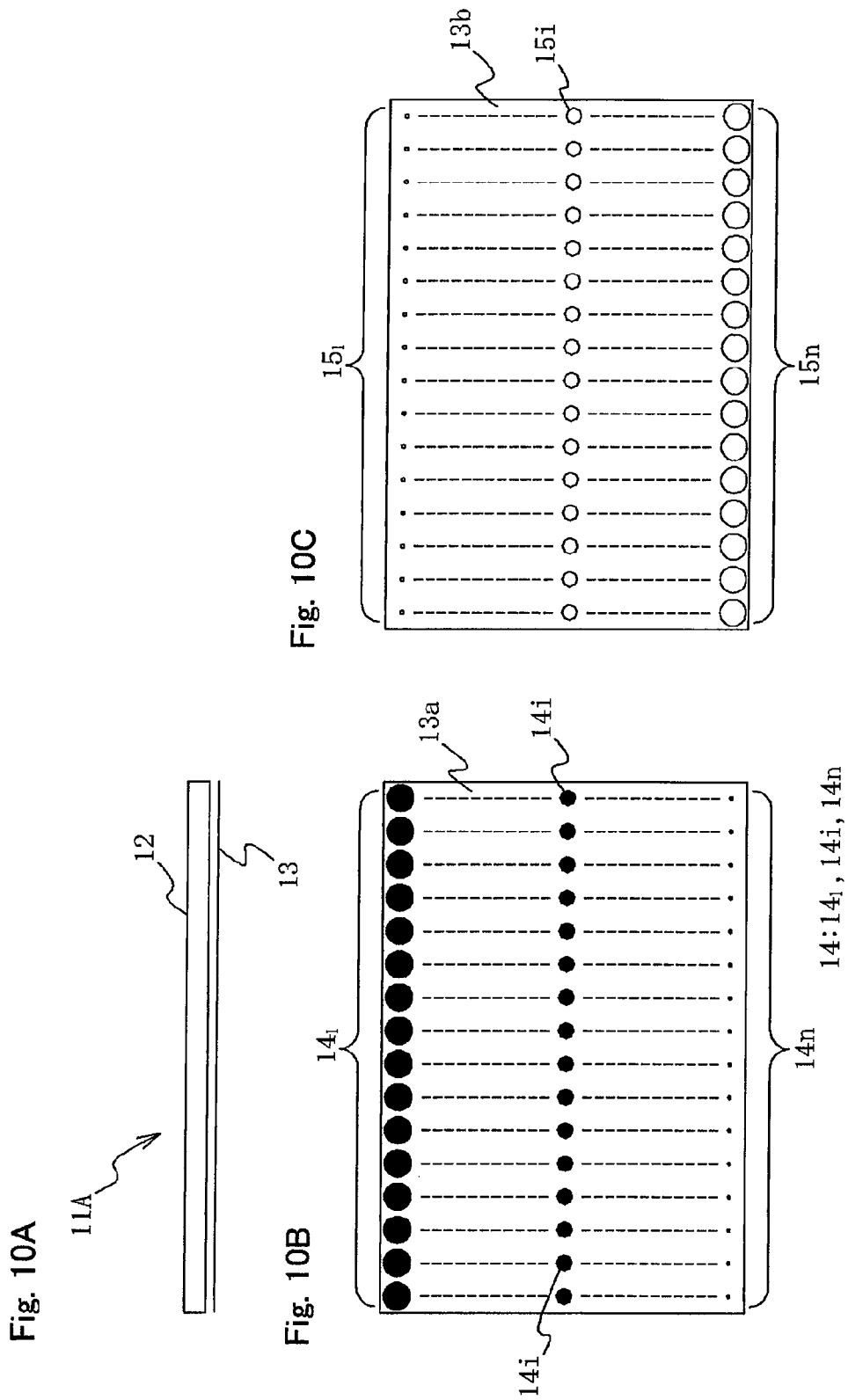
FIG. 10 illustrates the light diffusive member of the illumination device of FIG. 1.

The light diffusive member is described with reference to FIG. 10. FIG. 10 illustrates the light diffusive member, FIG. 10A is a cross-sectional view of the light diffusive member taken along the longitudinal direction, FIG. 10B is a plan view of a diffusive sheet attached on the light diffusive member, and FIG. 10C is a modification of the diffusive sheet of FIG. 10B.

The first and the second light diffusive members 11A and 11A' illustrated in FIG. 7 have the same configuration. Thus, one light diffusive member 11A is described.

As illustrated in FIG. 10, the light diffusive member 11A includes a light diffusive panel 12 having an elongated rectangular shape with opposing long sides and opposing short sides, and a diffusive sheet 13 attached on one of the surfaces of the light diffusive panel 12. A known light diffusive plate, such as the one formed of a semitransparent glass plate or a synthetic resin plate is used for the light diffusive panel 12. The diffusive sheet 13 is formed of a sheet material having a shape same as that of the light diffusive panel 12. The diffusive sheet 13 is formed of a light reflection/transmission sheet of which the reflection rate and the light transmission rate vary from one end to the other in accordance with the distance from the light source. Specifically, the light reflection rate is high at a portion close to the LED 4 and gradually decreases as it gets farther from the LED 4, whereas the light transmission rate is low at a portion close to the LED 4 and gradually increases as it gets farther from the LED 4. As illustrated in FIG. 10B, the diffusive sheet 13 is formed by providing a light transmissive sheet, e.g., a film-like transparent sheet 13a with a plurality of reflective dots 14 of a specific shape made of a reflective material having a high reflection rate, the reflective dots 14 being arranged in a specific pattern of $14_1$ to $14i$ to $14n$. In FIG. 10B, the reflective dots 14 are so formed that the reflective dots $14_1$ at the area close to the light source (LED) have a large area, the reflective dots $14i$ at the intermediate area have a medium size, and the reflective dots $14n$ at the area farther from the light source have a small area. The areas of the reflective dots $14_1$ to $14i$ to $14n$ are set to vary to be large, medium, and small in accordance with the distance from the light source. Instead, because the LED 4 has the light distribution characteristics as illustrated in FIG. 2, the areas of the reflective dots 14 may vary in accordance with the directional angles. The diffusive sheet 13 may be formed of a reflective sheet 13b having a high reflection rate provided with openings $15_1$ to $15i$ to $15n$ through which light passes.

Next, an operation of the illumination device 1 is described with reference mainly to FIG. 5 and FIG. 7.

As illustrated in FIG. 4 and FIG. 5, in the illumination device 1, the light source device 3 and the pair of light diffusive members 11A and 11A' are incorporated in the frame 2 having a frame-like body, and in the light source device 3, the pair of first and second polarizing reflective plates 9A and 9B are incorporated in the space 8 in the reflective hood 7. As illustrated in FIG. 7, when the irradiation light is emitted by the LED 4 in the light source device 3, direct light from the LED 4, reflection light reflected by the inner surface 7c' of the reflective hood 7, and the reflection light reflected by the surfaces 9a of the polarizing reflective plates 9A and 9B pass through the gap $9_G$ between the first and the second polarizing reflective plates 9A and 9B to be radiated on the first and the second light diffusive members 11A and 11A'. Accordingly, the irradiation area (illumination area) is set in accordance with the tilt angle α of the pair of first and second polarizing reflective plates 9A and 9B and the pair of first and second light diffusive members 11A and 11A' are irradiated with the light. The illumination area is so set that illumination light corresponding to the illumination distribution simulation is provided on the surfaces of the first and the second light diffusive members 11A and 11A'. Moreover, in the space 8 in the reflective hood 7, the gap $8_G$ is provided between the inner surface 7c' and each of the ends of the pair of first and second polarizing reflective plates 9A and 9B. Thus, the direct light from the LED 4 and the reflection light reflected by the inner surface of the reflective hood 7 pass through the gap 8$_G$ to be radiated on and reflected by the inner surface 7c'. This reflected light is reflected by the rear surfaces 9b of the polarizing reflective plates 9A and 9B to be radiated on the first and the second light diffusive members 11A and 11A'. Due to this irradiation, portions of the light diffusive members 11A and 11A' near the long side frames 2a of the frame 2 are prevented from being dark. Specifically, although a portion near the long side frames 2a may be dark with the light source device 3, by providing the gap 8$_G$, this disadvantage can be resolved. In the illumination device 1, the pair of first and second polarizing reflective plates 9A and 9B have the gap 9$_G$ provided therebetween and are tilted by the specific angle α with respect to the optical axis. Thus, the irradiated light from the LED 4 partly passes straight through the gap 9$_G$ directly and is partly shielded and reflected by the first and the second polarizing reflective plates 9A and 9B. As a result, the surfaces of the light diffusive members are irradiated with the light with the illumination areas on the pair of first and second light diffusive members 11A and 11A' opposing to each other set to be dispersed to a certain range. Therefore, uniform planar illumination for a large area can be achieved. Moreover, the portions of the first and the second light diffusive members 11A and 11A' near the long side frames 2a of the frame 2 are irradiated with the light emitted through the gap 8$_G$ and are thus prevented from being dark. In the illumination device 1, the light source device 3 has the plurality of cells 8A formed in the space in the reflective hood 7. Thus, the irradiation light from the LED 4 in each of the cells is reflected by the inner wall of the cell, i.e., the reflective surfaces of the reflective hood 7 and the partitioning reflective plates 10 and then emitted from the gap opening 8a of the space 8. With this irradiation light, the illuminances of the adjacent cells 8A near the gap opening 8a are uniform.

The illumination device 1 according to the first embodiment of the present invention is formed to perform double-faced illumination with the pair of opposing light diffusive members being irradiated with light from the LEDs. Alternatively, the illumination device 1 may perform the single-faced illumination in which one of the plates is irradiated with the light. In this case, the single-faced illumination can be implemented by forming any one of the first and the second polarizing reflective plates with a reflective plate such as a mirror surface, and forming the first and the second light diffusive members with reflective plates of mirror surfaces to match the reflective plate.

Figure 11:
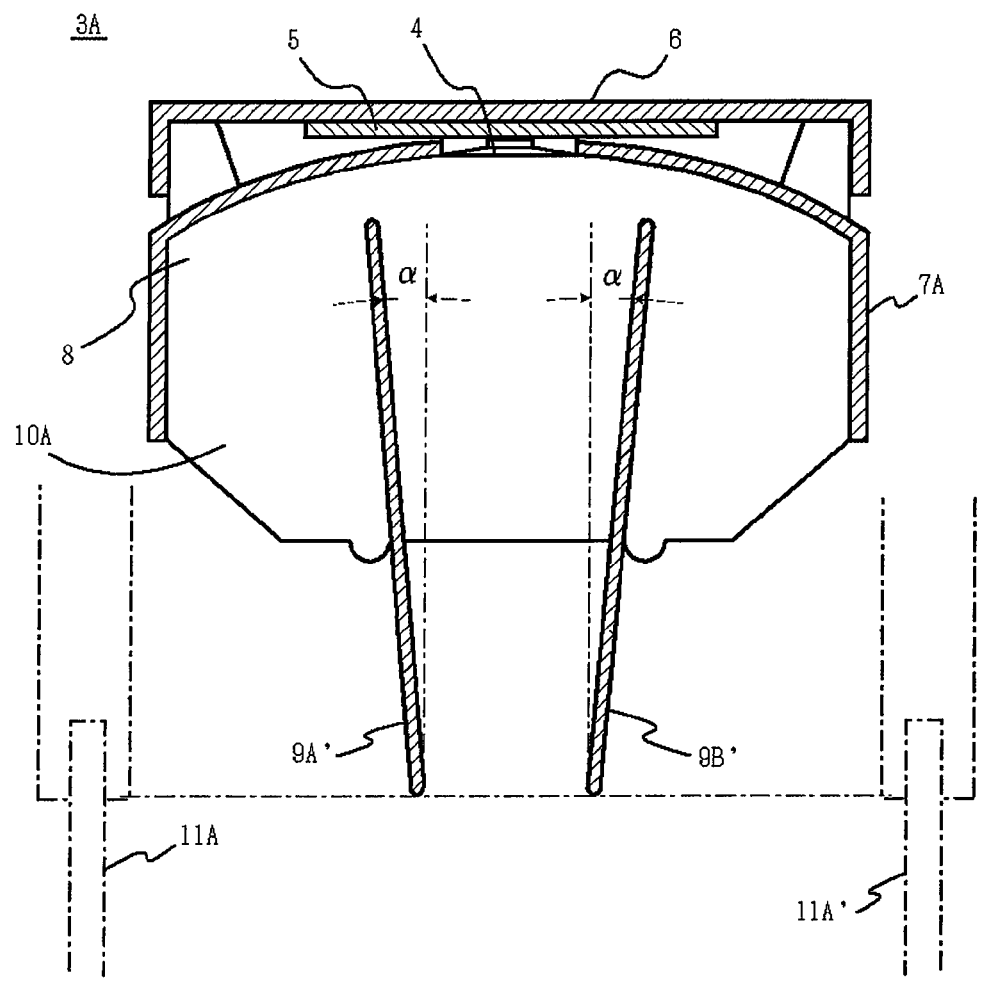
FIG. 11 is a schematic cross-sectional view of a light source device incorporated in an illumination device according to a second embodiment of the present invention.
Figure 12A:
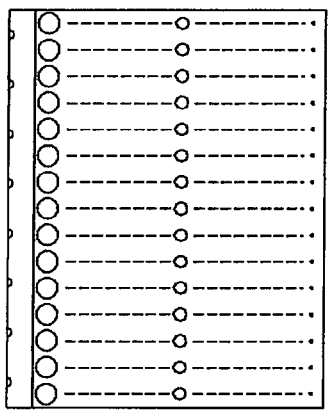
FIG. 12a to FIG. 12f are plan views for explaining modifications of the illumination device.
Figure 12B:
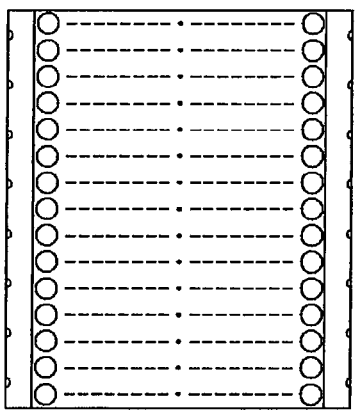
Figure 12C:
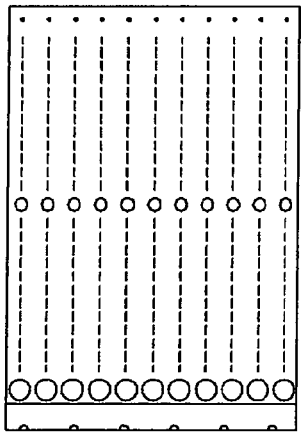
Figure 12D:
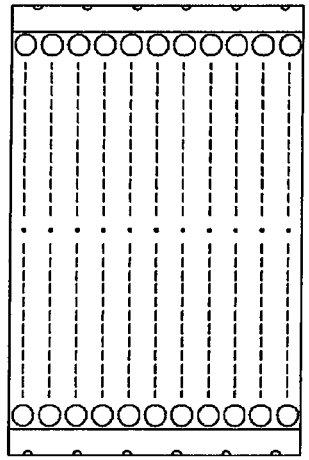
Figure 12E:
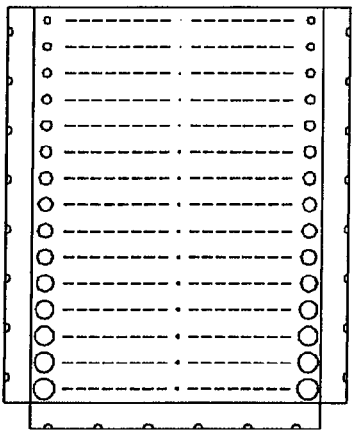
Figure 12F:
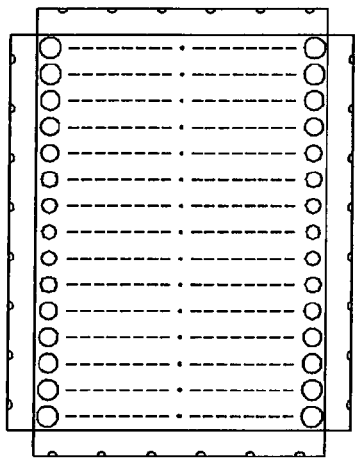

An illumination device according to a second embodiment of the present invention is described with reference to FIG. 11. FIG. 11 is a schematic cross-sectional view of a light source device to be incorporated in the illumination device according to the second embodiment of the present invention. FIG. 11 corresponds to FIG. 7 of the first embodiment.

The illumination device according to the second embodiment of the present invention is only partially different from the illumination device 1 of the first embodiment in some configurations and the other configurations are the same. The common configurations are given the same reference numerals and the description thereof is to be cited and thus the duplicating explanation is omitted, whereby the different configurations are described.

A light source device 3A is formed by partly changing the configurations of the reflective hood 7, the pair of first and second polarizing reflective plates 9A and 9B, and the partitioning reflective plates 10 included in the light source device 3. Specifically, a reflective hood 7A is made of a hood member with a relatively large bottom portion and a pair of short side reflective portions extending from the opposing surfaces of the bottom portion. First and second polarizing reflective plates 9A' and 9B' have the same configuration and the width thereof is relatively large so that the first and the second polarizing reflective plates 9A' and 9B' protrude from the opening of the space 8 when being incorporated in the reflective hood 7A. Partitioning reflective plates 10A have a length large enough to also protrude from the opening of the space 8. This illumination device provides effects similar to those of the illumination device of the first embodiment.

The illumination devices according to the embodiments of the present inventions are described above. It is noted that the present invention is not limited to these and various modifications can be made. In the illumination device 1, the light source device is provided in the long side frame of the frame having the frame-like shape. Instead, the light source device may be provided in any one of the sides besides the long side frames or may be provided in a plurality of sides of the frame. For these arrangements of the light source device, the light diffusive member is used with a diffusive sheet suitable for each of the illumination devices selected as illustrated in FIG. 12a to FIG. 12f.

The light source devices 3, 3A are each used for the illumination device in combination with the light diffusive member. Instead, these light source devices can be used as independent illumination devices.

Figure 13:
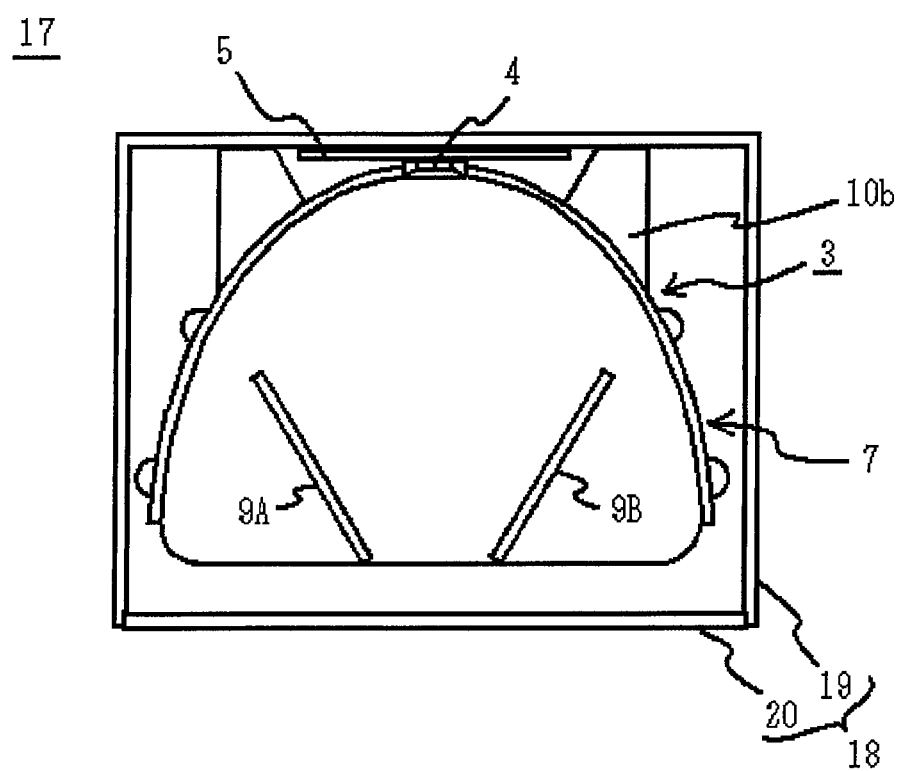
FIG. 13 is a schematic cross-sectional view of an illumination device according to a third embodiment of the present invention.

This illumination device is described below with reference to FIG. 13. FIG. 13 is a schematic cross-sectional view of an illumination device according to a third embodiment of the present invention.

An illumination device 17 is formed by incorporating the light source device 3 in a casing 18. More specifically, the illumination device 17 has a configuration in which the light source device 3 is incorporated in the casing 18 including a main body casing 19 that covers the curved portion of the reflective hood 7 and a transparent plate 20 that covers the opening of the main body casing. With this illumination device, a desired illumination area can be set with an illumination area not being concentrated but being appropriately dispersed. In the third embodiment, the light source device 3 is incorporated in the casing. Instead, the other light source device 3A can be incorporated in the casing.

EXPLANATION OF REFERENCE NUMERALS

1 illumination device
2 frame
3, 3A light source device
4 LED
5 base
7, 7A reflective hood
8 space
8A cell
8$_G$ gap
9A, 9B, 9A', 9B', $LF_1$, $LF_2$ polarizing reflective plate
9$_G$ gap
10 partitioning reflective plate
11A, 11A', $P_1$, $P_2$ light diffusive member
12 light diffusive panel
13 diffusive sheet
14 reflective dot
15 opening
16 opposing side equipment
17 illumination device
18 casing
20 transparent plate Ax optical axis
α angle
ID illumination device
LS light source
G gap

The invention claimed is:

1. A light source device comprising:
a highly directional point light source;
a reflective hood that has a bottom portion on which the point light source is secured and a pair of side reflective portions opposing to each other extending outward from opposing sides of the bottom portion and having open end portions, an inner space of a specific volume defined by the bottom portion and the pair of side reflective portions inside, and an inner wall surface formed of a reflective surface; and
a pair of first and second polarizing reflective plates that polarize irradiation light from the point light source to a specific direction, wherein
the first and the second polarizing reflective plates are each made of a plate material having a specific length and width and a high reflection rate on front and rear surfaces,
at least one such point light source is secured on the bottom portion of the reflective hood, and
the first and the second polarizing reflective plates are tilted by a specific angle α with respect to an optical axis passing through the 0° direction angle of the point light source so that a specific gap is provided between the first and the second polarizing reflective plates and the reflective surface of the reflective hood, and a specific gap is provided between the first and the second polarizing reflective plates with the optical axis in between in such a manner that the gap is larger at a portion closer to the point light source and the gap is smaller at a portion away from the point light source.

2. The light source device according to claim 1, wherein the bottom portion and the pair of side reflective portions of the reflective hood extend in the longitudinal direction for a specific length, the point light source is provided in plurality on the extended bottom portion at specific intervals in the longitudinal direction, and in the internal space, the point light sources are partitioned by partitioning reflective plates, and the first and the second polarizing reflective plates are supported by the partitioning reflective plates.

3. The light source device according to claim 1, wherein the first and the second polarizing reflective plates have end portions farthest from the point light source positioned within the gap of the reflective hood or protruding outward from the gap.

4. The light source device according to claim 1, wherein the tilt angle α is in a range from 6 degrees to 30 degrees.

5. The light source device according to claim 1, wherein the reflective hood is formed of a reflective material that has a high light reflection rate and irregularly reflects light, and the first and the second polarizing reflective plates and the partitioning reflective plates are each formed of a reflective material having a high light reflection rate and low light absorption and transmission rates and irregularly reflecting light.

6. The light source device according to claim 5, wherein the reflective hood, the first and the second polarizing reflective plates, and the partitioning reflective plates are each formed of an ultrafinely foamed light reflective material.

7. The light source device according to claim 1, wherein the point light source is a light emitting diode or laser diode made of a single light emitting element or an assembly of a plurality of light emitting elements.

8. An illumination device comprising:
first and second light diffusive members having a rectangular shape with a specific width and length arranged opposing to each other with a specific gap provided therebetween; and
the light source device according to claim 1 provided in a gap between end sides of the first and the second light diffusive members on at least one side.

9. The illumination device according to claim 8, wherein in the first and the second light diffusive members, a light reflection rate is set to be higher at a portion on a side closer to the point light source and gradually lower toward the other side away from the point light source, whereas a light transmission rate is set to be lower at a portion on the side closer to the point light source and gradually higher toward the other side away from the point light source.

10. The illumination device according to claim 8, wherein any one of the first and the second light diffusive members is a reflective plate.

* * * * *